United States Patent [19]

Pfundstein

[11] Patent Number: 5,375,251
[45] Date of Patent: Dec. 20, 1994

[54] METHOD FOR GENERATING A TEMPORARY MOBILE SUBSCRIBER IDENTITY SIGNAL (TMSI) FROM A PERMANENT MOBILE STATION IDENTITY SIGNAL (IMSI)

[75] Inventor: Matthias Pfundstein, Stuttgart, Germany

[73] Assignee: Standard Elektrik Lorenz Aktiengesellschaft, Stuttgardt, Germany

[21] Appl. No.: 897,334

[22] Filed: Jun. 11, 1992

[30] Foreign Application Priority Data

Jun. 14, 1991 [DE] Germany .............................. 4119573

[51] Int. Cl.⁵ .............................................. H04B 7/26
[52] U.S. Cl. .................................. 455/33.4; 455/53.1; 455/54.1; 379/59
[58] Field of Search ................. 485/33.1, 33.4, 54.1, 485/54.2, 56.1, 53.1; 379/59, 60, 63, 62; 340/825.31, 825.34, 825.44; 380/42, 49

[56] References Cited

U.S. PATENT DOCUMENTS 5,123,111 6/1992 Delory et al. .............. 455/34.1
5,239,294 8/1993 Flanders et al. .................. 379/62 X

FOREIGN PATENT DOCUMENTS 0117906 9/1984 European Pat. Off. .
0464425 1/1992 European Pat. Off. .

OTHER PUBLICATIONS

Telephone Engineer and Management Bd. 95, Nr. 2, 15. Jan. 1991, US Seiten 50 –54 "Security and Saturation Solutions for GSM" by Delory et al.

Primary Examiner—Curtis Kunte
Assistant Examiner—Chi Pham
Attorney, Agent, or Firm—Ware, Fressola, Van Der Sluys & Adolphson

[57] ABSTRACT

A method of determining a temporary subscriber number (TMSI) in a subscriber data base is disclosed. Subscriber data bases with large subscriber-data fluctuations require special strategies to ensure optimum utilization of the available storage space while keeping access times as short as possible. In addition, subscriber anonymity is to be ensured. A method is provided for assigning a memory location to each subscriber via a temporary subscriber number (4-byte TMSI). The invention uses an internal structure for the TMSI which consists of several logically independent elements which, on the one hand, permit as large an addressing range as possible and, on the other hand, preclude any confusion of data records or any identification of the subscriber. In addition, the TMSI is constantly changed. With a 32-bit TMSI, up to $10^6$ subscribers can be unambiguously addressed.

12 Claims, 2 Drawing Sheets

METHOD FOR GENERATING A TEMPORARY MOBILE SUBSCRIBER IDENTITY SIGNAL (TMSI) FROM A PERMANENT MOBILE STATION IDENTITY SIGNAL (IMSI)

TECHNICAL FIELD

The present invention relates to a method of determining a temporary mobile subscriber identity (TMSI) in subscriber data bases, e.g., in mobile-radio systems.

BACKGROUND OF THE INVENTION

In conventional telephone exchanges, the subscriber fluctuation is only small and is determined essentially by changes of the subscribers locations. As a result, the fluctuation of subscriber data in the associated subscriber data bases is also small. In mobile-radio systems, this is completely different. Although the data of mobile-telephone subscribers is stored where the mobile-radio stations are registered, namely in a so-called home location register (HLR), it is not generally to be expected that a mobile-telephone subscriber is constantly in the service area of the same switching center in which his subscriber data is stored. It is rather conceivable that a mobile-telephone subscriber who is far away from his residence, possibly in another country, wishes to set up a telephone connection with another, likewise travelling mobile-radio subscriber. To permit such connections, a number of mobile switching centers (MSC) are distributed over the area in which the mobile-radio system is to be operated. Unlike data bases of conventional telephone exchanges, the data bases of mobile switching centers, so-called visitor location registers (VLRs), must work properly even with high subscriber fluctuation.

DE 40 21 632 A1 proposes a method of filing or finding subscriber data records in a subscriber data base with high subscriber fluctuation. In that method, a data record in a memory area is unambiguously assigned to an N-digit subscriber number IMSI (International Mobile Station Identity) with the aid of an algorithm. This permits access to a VLR subscriber data record. The algorithm generates virtual indices V0 through V4, with the aid of which the data record in a memory area is determined. A 15-digit IMSI can be mapped by the algorithm into independent values V0, ..., V4 as follows:

$$VC = (D(0) + D(1) + D(2) + D(3) + D(4) +$$
$$D(5) + D(6) + D(7) + D(8) + D(9) + D(10) +$$
$$D(11) + D(12) + D(13) + D(14)) \%2$$

$$V0 = (1*(D(9) + D(13) + D(0)) + 2*(D(7) + D(12) +$$
$$D(2)) + 3*(D(11) + D(14) + D(3)) + 5*(D(10) + D(6) +$$
$$D(4)) + 7*(D(8) + D(5) + D(1)) + VC) \%10$$

$$V1 = (1*(D(10) + D(14) + D(1)) + 2*(D(8) + D(13) +$$
$$D(3)) + 3*(D(7) + D(5) + D(4)) + 5*(D(11) + D(12) +$$
$$D(0)) + 7*(D(9) + D(6) + D(2))) \%10$$

$$V2 = (1*(D(11) + D(5) + D(2)) + 2*(D(9) + D(14) +$$
$$D(4)) + 3*(D(8) + D(6) + D(0)) + 5*(D(7) + D(13) +$$
$$D(1)) + 7*(D(10) + D(12) + D(3))) \%10$$

$$V3 = (1*(D(7) + D(6) + D(3)) + 2*(D(10) + D(5) +$$
$$D(0)) + 3*(D(9) + D(12) + D(1)) + 5*(D(8) + D(14) +$$
$$D(2)) + 7*(D(11) + D(13) + D(4))) \%10$$

$$V4 = (1*(D(8) + D(12) + D(4)) + 2*(D(11) + D(6) +$$
$$D(1)) + 3*(D(10) + D(13) + D(2)) + 5*(D(9) + D(5) +$$
$$D(3)) + 7*(D(7) + D(14) + D(0))) \%10$$

where:
V0 through V4=the digits of the virtual indices
D(0) through D(14)=the digits of the subscriber number
A%B=A modulo B
VC=a correcting quantity calculated from all 15 digits of the IMSI.

For repeated accesses, the Temporary Mobile Subscriber Identity Signal formed with the aid of this algorithm offers a more appropriate "key", since the IMSI consists of 15 digits; in addition, in case of unencoded accesses (radio link), the subscriber's identity cannot be kept anonymous with the IMSI.

It is, therefore, the object of the invention to provide a method wherein each subscriber is assigned a TMSI-in a VLR. With the aid of this TMSI, communications are to be established between VLR and subscriber. This object is attained by a method of determining a temporary mobile subscriber identity signal (TMSI) in a telecommunication network comprising a subscriber data base on the basis of a permanent mobile station identity signal (IMSI) permanently assigned to a subscriber, characterized by the following steps: determining a memory area index signal (MR) and a data-record index signal (DS-IX) in the subscriber data base from the permanent mobile station identity signal (IMSI), the memory area index signal (MR) being a first part of the temporary mobile subscriber identity signal (TMSI); encoding the data-record index signal (DS-IX) by adding an addition parameter signal (ADD-PAR) which is dependent on a generation parameter index signal (GP-IX) to form a temporary subscriber index signal (TMSI-IX), providing the temporary subscriber index signal (TMSI-IX) as a second part of the temporary mobile subscriber identity signal (TMSI), providing the generation parameter index signal (GP-IX) as a third part of the temporary mobile subscriber identity digital signal (TMSI), and providing additional information signal (RC, CD) about the status of the subscriber data base as fourth and fifth parts of the temporary mobile subscriber identity signal (TMSI). Further advantageous features of the invention are that the generation parameter index signal (GP-IX) address a generation parameter table (GEN-TAB), thus generating the addition parameter signal (ADD-PAR); that to generate a new temporary subscriber identity signal (TMSI), the generation parameter index signal (GP-IX) is incremented; that the values of the generation parameter table (GEN-TAB) are changed at time intervals; that the information on the status of the subscriber data base is contained in a recovery code signal (RC) and in a configuration discriminator signal (CD); that the recovery code signal (RC) is incremented when the data of a memory area (MR) is lost; that the configuration discriminator signal (CD) is incremented when data changes its location; that the configuration discriminator signal (CD) can be incremented when the recovery code signal (RC) overflows to 0 during incrementation; that the TMSI is a digital signal which consists of 32 bits; and that the TMSI of a subscriber, together with the subscriber signal, such as the International Mobile Station Identity signal (IMSI) is permanently assigned to said subscriber, and entered into a table (EXCL-TAB) before being deleted from the data base. The method according to the invention users a four-byte-long TMSI. Anonymity of the subscriber is ensured by frequent changes of elements of the TMSI.

One advantage of the method to the invention lies in the unambiguous addressing of up to $10^6$ subscribers. Another advantage is that any confusion of data records is excluded even if a data record in the data base is deleted or if all data records of a memory area MR are lost.

A further advantage of the method lies in the face that data-base extensions and reconfigurations of data are supported. In addition, losses of data in the memory are prevented.

BRIEF DESCRIPTION OF THE DRAWINGS

An embodiment of the invention will now be described with reference to the accompanying drawings, in which.

BEST MODE FOR CARRYING OUT THE INVENTION

Figure 1:
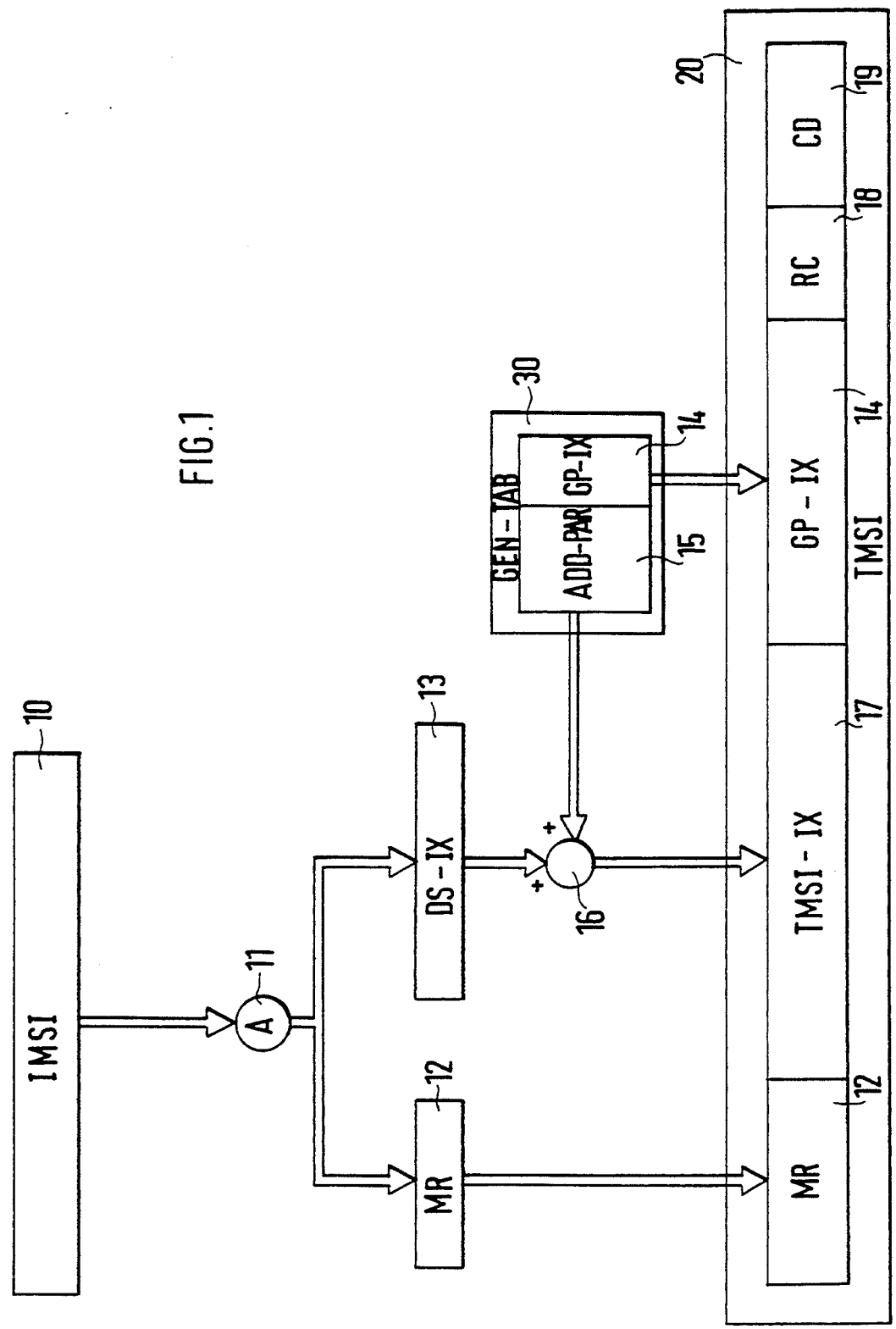
FIG. 1 is a schematic representation of the TMSI determination.

FIG. 1 is a block diagram illustrating the assignment of a TMSI 20 to an IMSI 10 in accordance with the invention. Via an algorithm 11 in the VLR, the subscriber with an IMSI 10 is assigned a memory area MR 12 and a data record with a data-record index DS-IX 13 in this memory area. This may be done as described in the above-mentioned DE 40 21 632 A1. The value for the memory area MR12 is six (or five) bits long; the value for the data-record index DS-IX 13 is 14 (or 15) bits long.

This makes it possible to address 64 memory areas MR12 each containing 16,384 data records. The value for the memory area MR12 occupies six bits of the TMSI 20. The unambiguous assignment of a memory location to a subscriber is thus effected with these two parameters. In addition, however, the subscriber's anonymity must be ensured. At the same time, any confusion of data records to be deleted or of memory areas to be cleared must be excluded. In the method according to the invention, this is accomplished by the following steps.

To permit the subscriber identity to be encoded, an addition parameter ADD-PAR 16 is selected from generation table GEN-TAB 30. The values ADD-PAR 16 are 16-bit pseudorandom values and are addressed with the aid of a generation parameter index GP-IX 14 from the generation table GEN-TAB 30. The addition parameter ADD-PAR 16 is added to the data-record index DS-IX 13 to obtain a 15-bit TMSI index TMSI-IX 17, which occupies 15 bits of the TMSI 20.

To make any identification of a subscriber impossible, the TMSI 20 is frequently changed. To generate a new TMSI 20 for a subscriber with the data record unambiguously assigned to this subscriber, the generation parameter index GP-IX 14 is incremented. With the new value for GP-IX 14, the new pseudorandom addition parameter ADD-PAR 16 is selected from the generation table GEN-TAB 30. Addition to the data-record index DS-IX 13 (which is constant for a subscriber in a VLR) gives a new value for the TMSI index TMSI-IX 17 in the new TMSI 20.

It is possible that for two different subscribers in a VLR that are assigned the same memory area MR 12, the sums of the data-record index DS-IX 13 and the pseudo-random addition parameter ADD-PAR 16 become equal although the addends are different. To preclude this ambiguity, the TMSI 20 also includes the 6-bit value of the generation parameter index GP-IX 14, since the two subscribers differ in their generation parameter indices GP-IX 14. In the TMSI 20, this value follows the value for the TMSI index TMSI-IX 17, which results from the addition of DS-IX 13 and ADD-PAR 16.

Further constituents of the structure of the TMSI 20 are a recovery code RC 18 and configuration discriminator 19. Both parameters permit further degrees of freedom in the unambiguous assignment of data records to subscriber numbers IMSI 10. These two parameters are to preclude any confusion of data records to be deleted or of memory areas MR 12 to be cleared. In addition, any confusion after a reconfiguration or after an expansion of the data base is avoided by means of these parameters.

The recovery code RC 18 is a 2-bit value, and all recovery codes of a memory area MR 12 are held as a block in a bulk storage (e.g., disk storage). The recovery code RC 18 is incremented when the data of a memory area MR 12 is lost. If the recovery code RC 18 overflows to zero during incrementation, those values of the 3-bit configuration discriminator CD 19 which belong to the memory area MR 18 are incremented. All configuration-discriminator values. belonging to a memory area MR 12 are also held as a block in the bulk storage. This value is also incremented if the data is reconfigured, i.e., if the data changes location.

With these two parameters, which occupy five bits of the TMSI 20, any confusion of data records is precluded if all data records of a group of memory areas MR 12 are lost (e.g., due to a power failure), and the portion of the data base thus erased is then newly occupied by other subscribers. If the erased subscribers then use their earlier assigned TMSIs 20, it may happen that a new subscriber has the same memory area MR 12, the same value for TMSI-IX 17, and the same value for GP-IX 14. In that case, any confusion is precluded by the fact that the values for the recovery codes RC 18 (or for the configuration discriminators CD 19) of the new and old subscribers are different.

Figure 2:
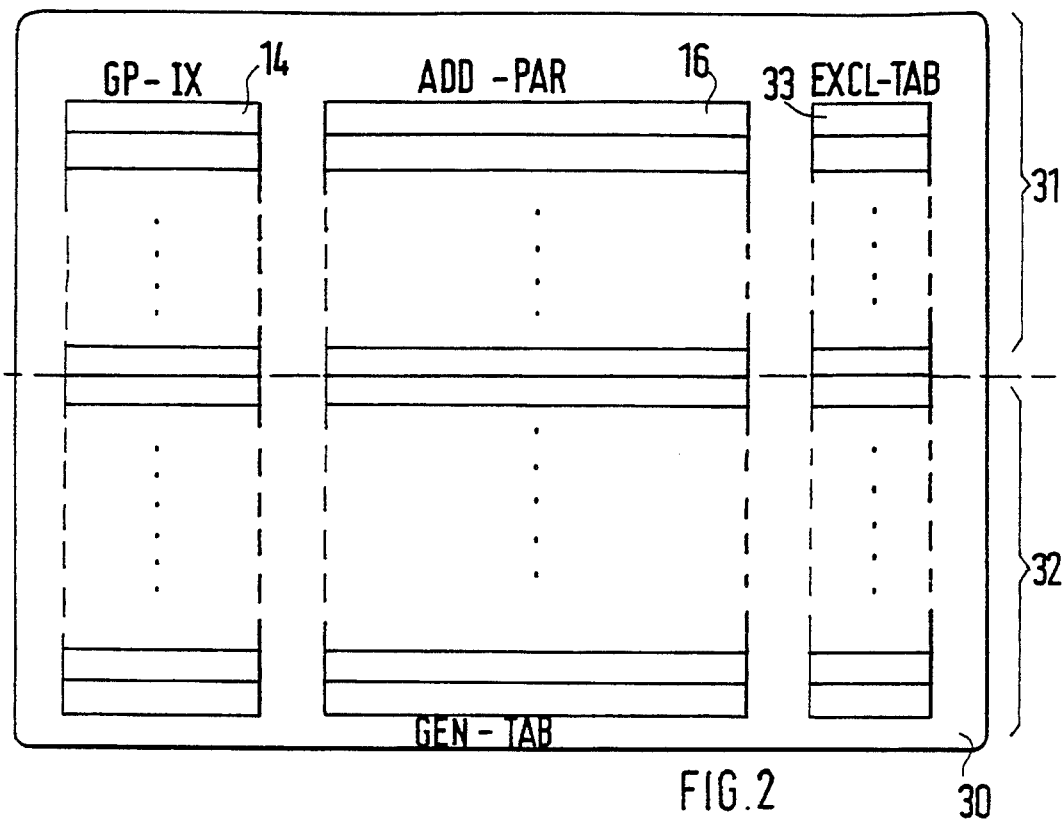
FIG. 2 shows the structure of the consideration table GEN-TAB.

FIG. 2 serves to explain the basic structure of the generation table GEN-TAB 30. Similar reference characters have been used to designate elements having the same functions as in FIG. 1.

For a better understanding of the method according to the invention, the generation table GEN-TAB 30 should be thought of as being divided into a first half 31 and a second half 32.

The values of the addition parameters ADD-PAR 16 are different pseudorandom numbers. The difference between the maximum and minimum values that the addition parameter ADD-PAR 16 can assume for a given generation parameter index GP-IX 14 is, e.g., 512. The TMSI 20, as described above, is constantly changed by incrementing the generation parameter index GP-IX 14. After a given period of time (e.g., 1 day), the addition parameters ADD-PAR 16 are newly generated in a bandwidth shifted by 512. The associated generation parameter indices GP-IX 14 must not be used by any stored data record in the TMSI. Thus, half of the generation parameter indices GP-IX 14 is blocked at a point of time. This problem is solved by using the first half 31 and the second half 32 alternately. If the addition parameters ADD-PAR 16 of either of the two halves (31 or 32) are to be changed, this half will remain inhibited and the TMSI 20 will be generated with the generation parameter indices GP-IX 14 of the other half.

In this manner, 32 different TMSIs 20 can be generated for a subscriber before values for the addition parameters ADD-PAR 16 have to be newly generated. If a subscriber needs more than 32 TMSIs 20 in the given period of time (e.g., one day). The generation parameter indices GP-IX 14 of the half being used will be traverse cyclically. Since this case is improbable, any inference of the subscriber's identity is virtually impossible.

The bandwidth of 512 fits 32 times into the range of values of the addition parameter ADD-PAR 16. Accordingly, it takes 32 days, for example, before the same bandwidth position recurs for a given generation parameter index GP-IX 14. The probability that after the 32 periods the same addition parameter index ADD-PAR 16 is assigned again for a generation parameter index GP-IX 14 is less than 0.2% (corresponding to 1/512).

If a data record is not used for a prolonged period of time, it may be deleted. The affected TMSI 20 and the IMSI 10 are entered into an exclusion-table EXCL-TAB 33. This TMSI can thus be excluded from reassignment by placing an entry for the associated generation parameter index GP-IX 14 into the exclusion table EXCL-TAB 33.

Figure 3:
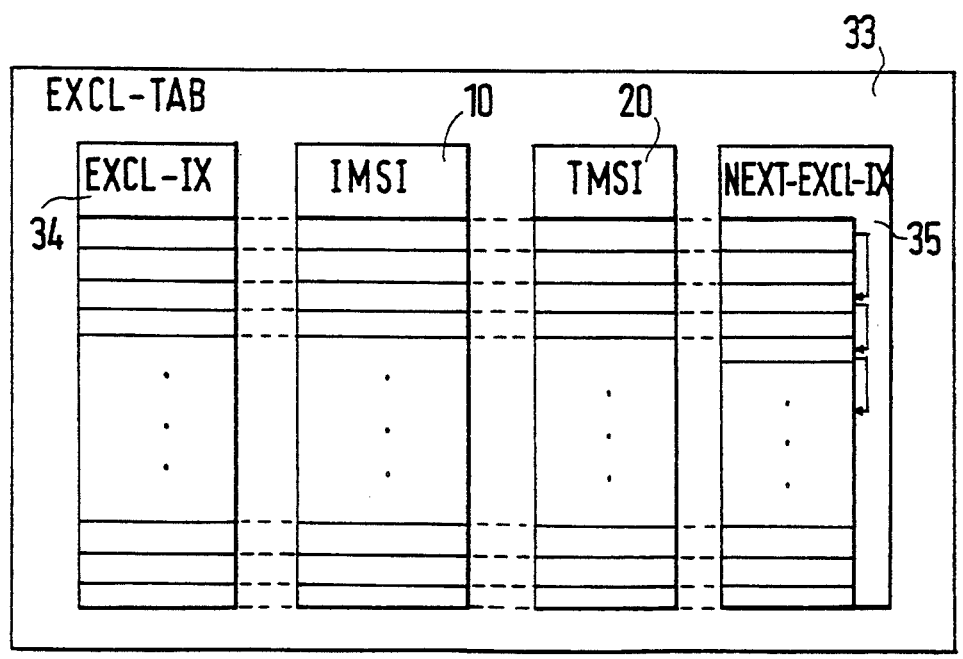
FIG. 3 shows the structure of the exclusion table EXCL-TAB.

The structure of the exclusion table EXCL-TAB 33 is illustrated in FIG. 3. The entry for the generation parameter index GP-IX 14 to be excluded is placed into the column for the exclusion index EXCL-IX 34. Also entered are the associated TMSI and TMSI. A further entry is the next exclusion index NEXT-EXCL-IX 35, with the aid of which the search for excluded IMSIs is continued.

A TMSI which is entered into the exclusion table EXCL-TAB 33 is not assigned anew. If an excluded TMSI 20 should happen to be generated for a subscriber, a new TMSI 20 must be generated with the next generation parameter GP-IX 14.

By the entry into the table EXCL-TAB 33, any confusion is excluded even if a data record, and hence its TMSI 20, is deleted-in the data base because the subscriber has not used his TMSI for a given time. As soon as another TMSI has been assigned to an IMSI, the IMSI (plus old TMSI) can be deleted from the EXCL table. This also eliminates the risk of memory locations being occupied by old, unused data records.

I claim:

1. A method of generating a Temporary Mobile Subscriber Identity signal (TMSI) in a telecommunication network comprising a subscriber data base on the basis of a subscriber signal permanently assigned to a subscriber, characterized by the following steps:
   generating a memory area index signal (MR) and a data-record index signal (DS-IX) for addressing a memory area and a data record in the subscriber data base from the subscriber signal, the memory area index signal (MR) being a first part of the Temporary Mobile Subscriber Identity signal (TMSI);
   encoding the data-record index signal (DS-IX) by adding an addition parameter signal (ADD-PAR) which is dependent on a generation parameter index signal (GP-IX) to form a temporary subscriber index signal (TMSI-IX),
   providing the temporary mobile subscriber index signal (TMSI-IX) as a second part of the Temporary Mobile Subscriber Identity signal (TMSI),
   providing the generation parameter index signal (GP-IX) as a third part of the Temporary Mobile Subscriber Identity signal (TMSI), and
   providing additional information signals about the status of the subscriber data base as fourth and fifth parts of the Temporary Mobile Subscriber Identity signal (TMSI).

2. A method as claimed in claim 1, characterized in that the generation parameter index signal (GP-IX) addresses a generation parameter table (GEN-TAB) comprising a plurality of values, thus generating the addition parameter signal (ADD-PAR).

3. A method as claimed in claim 2, characterized in that to generate a new Temporary Mobile Subscriber Identity signal (TMSI), the generation parameter index signal (GP-IX) is incremented.

4. A method as claimed in claim 2, characterized in that the values of the generation parameter table (GEN-TAB) are changed at time intervals.

5. A method as claimed in claim 1, characterized in that the information about the status of the subscriber data base is contained in a recovery code (RC) and in a configuration discriminator (CD).

6. A method as claimed in claim 5, characterized in that the recovery code (RC) is incremented when data of a memory area index signal (MR) is lost.

7. A method as claimed in claim 5, characterized in that the configuration discriminator (CD) is incremented when data of a memory area index signal (MR) changes its location.

8. A method as claimed in claim 5, characterized in that the configuration discriminator (CD) is incremented when the recovery code (RC) overflows to 0 during incrementation.

9. A method as claimed in claim 1, characterized in that the Temporary Mobile Subscriber Identity signal (TMSI) consists of 32 bits.

10. A method as claimed in claim 1, characterized in that the Temporary Mobile Subscriber Identity signal (TMSI) of a subscriber, together with the subscriber signal permanently assigned to said subscriber, is entered into a table (EXCL-TAB) before being deleted from the data base.

11. A method of generating a Temporary Mobile Subscriber Identity signal (TMSI) as claimed in claim 1, wherein the subscriber signal is an International Mobile Station Identity signal (IMSI).

12. A method of transforming an International Mobile Station Identity Digital signal (IMSI) assigned to a subscriber at a mobile radio home station into a Temporary Mobile Subscriber Identity digital signal (TMSI) assigned to the subscriber at a mobile switching center (MSC) which is outside a calling area serviced by the mobile radio home station, comprising the steps of:

receiving the International Mobile Station Identity digital signal (IMSI) of the subscriber in the mobile switching center (MSC);

assigning a memory area in a subscriber data base from the International Mobile Station Identity digital signal (IMSI) and generating a memory area index digital signal (MR) for addressing the memory area;

providing the memory area index digital signal (MR) as a first part of the Temporary Mobile Subscriber Identity digital signal (TMSI);

assigning a data-record in the memory area in the subscriber data base from the international mobile station identity digital signal (IMSI) and generating a data-record index digital signal (DS-IX) for indexing the data record in the memory area;

generating a generation parameter index digital signal (GP-IX) for indexing a generation table (GEN-TAB);

generating an addition parameter digital signal (ADD-PAR) from the generation table (GEN-TAB) in response to the generation parameter index digital signal (GP-IX);

combining the data-record index digital signal (DS-IX) and the addition parameter digital signal (ADD-PAR) to form a temporary mobile subscriber index digital signal (TMSI-IX) for encoding a subscriber's identity;

providing the temporary mobile subscriber index digital signal (TMSI-IX) as a second part of the Temporary Mobile Subscriber Identity digital signal (TMSI);

providing the generation parameter index digital signal (GP-IX) as a third part of the Temporary Mobile Subscriber Identity digital signal (TMSI);

providing a recovery code digital signal (RC) having information on the status of the subscriber database as a fourth part of the Temporary Mobile Subscriber Identity digital signal (TMSI);

providing a configuration discriminator digital signal (CD) having information about a change in location of the subscriber database as a fifth part of the Temporary Mobile Subscriber Identity digital signal (TMSI); and assigning the Temporary Mobile Subscriber Identity digital signal (TMSI) to the subscriber in the mobile switching center (MSC).

* * * * *